US012675010B2

(12) United States Patent
Ikari et al.

(10) Patent No.: US 12,675,010 B2
(45) Date of Patent: Jul. 7, 2026

(54) PARAMAGNETIC GARNET-TYPE TRANSPARENT CERAMIC, MAGNETO-OPTICAL MATERIAL, AND MAGNETO-OPTICAL DEVICE

(71) Applicant: Shin-Etsu Chemical Co., Ltd., Tokyo (JP)

(72) Inventors: Masanori Ikari, Annaka (JP); Takuto Matsumoto, Annaka (JP); Keita Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 267 days.

(21) Appl. No.: 18/708,087

(22) PCT Filed: Oct. 27, 2022

(86) PCT No.: PCT/JP2022/040094
§ 371 (c)(1),
(2) Date: May 7, 2024

(87) PCT Pub. No.: WO2023/085107
PCT Pub. Date: May 19, 2023

(65) Prior Publication Data
US 2024/0427178 A1      Dec. 26, 2024

(30) Foreign Application Priority Data

Nov. 15, 2021      (JP) .................................. 2021-185376

(51) Int. Cl.
*G02F 1/09*          (2006.01)
*C04B 35/44*          (2006.01)
(Continued)

(52) U.S. Cl.
CPC .............. *G02F 1/093* (2013.01); *C04B 35/44* (2013.01); *C04B 35/505* (2013.01); *G02F 1/0036* (2013.01); *C04B 2235/3224* (2013.01)

(58) Field of Classification Search
CPC .......... G02F 1/093; G02F 1/0036; G02F 1/09; C04B 35/505; C04B 2235/3225; C04B 2235/764; C04B 2235/9646
(Continued)

(56) References Cited

U.S. PATENT DOCUMENTS 8,804,240 B2 * 8/2014 Funaki .................... C30B 29/28
252/585
10,168,556 B2 * 1/2019 Watanabe ............... G02F 1/093
(Continued)

FOREIGN PATENT DOCUMENTS

JP          2002-293693 A      10/2002
JP            3642063 B2      4/2005
(Continued)

OTHER PUBLICATIONS

Aung et al., "Development of optical grade (TbxY1-x)3Al5O12 ceramics as Faraday rotator material", J. Am. Ceram. Soc., 2017, 100, pp. 4081-4087, cited in Specification (7 pages).
(Continued)

*Primary Examiner* — Bumsuk Won
*Assistant Examiner* — Seth D Moser
(74) *Attorney, Agent, or Firm* — WHDA, LLP

(57)                    ABSTRACT

The paramagnetic garnet-type transparent ceramic a sintered object of a composite oxide represented by formula (1), $(Tb_{1-x-y}Y_xSc_y)_3(Al_{1-z}Sc_z)_5O_{12}$ ($0.05 \leq x < 0.4$, $0 \leq y < 0.004$, $0.6 \leq 1-x-y < 0.95$, $0 \leq z < 0.004$, and $0.001 < y+z < 0.005$), which contains $SiO_2$ as a sintering aid in an amount larger than 0 mass % but not larger than 0.1 mass %, and having an average sinter-grain diameter of 5 μm or larger. The trans-
(Continued)

parent ceramic has a total light transmittance of 84.0% or greater and a forward scatter of 0.5% or less at an optical path length of 25 mm and a wavelength of 1,064 nm and has a total light transmittance of 84.0% or greater and a forward scatter of 0.5% or less at an optical path length of 25 mm and a wavelength of 1,300 nm. In the formula (1).

8 Claims, 1 Drawing Sheet

(51) Int. Cl.
    *C04B 35/505*       (2006.01)
    *G02F 1/00*        (2006.01)
(58) Field of Classification Search
    USPC ........................ 359/484.03, 484.02; 252/585
    See application file for complete search history.

(56) References Cited

U.S. PATENT DOCUMENTS

| | | | |
|---|---|---|---|
| 2004/0035357 A1 | 2/2004 | Sekijima et al. | |
| 2005/0157219 A1 | 7/2005 | Sekijima et al. | |
| 2008/0165418 A1* | 7/2008 | Scerbak | G02B 6/2746 |
| | | | 359/489.09 |
| 2009/0108507 A1* | 4/2009 | Messing | B28B 1/002 |
| | | | 264/605 |
| 2011/0181950 A1* | 7/2011 | Makikawa | G02F 1/0036 |
| | | | 359/484.03 |
| 2012/0326196 A1* | 12/2012 | Zheng | C09K 11/7774 |
| | | | 252/301.4 R |
| 2013/0038927 A1 | 2/2013 | Hatanaka et al. | |
| 2016/0145765 A1 | 5/2016 | Matsui et al. | |
| 2019/0353939 A1* | 11/2019 | Ikari | C01F 17/34 |
| 2019/0359496 A1 | 11/2019 | Tanaka et al. | |
| 2019/0366584 A1* | 12/2019 | Matsumoto | C04B 35/505 |
| 2020/0117026 A1* | 4/2020 | Ikari | C04B 35/44 |
| 2023/0317325 A1* | 10/2023 | Matsumoto | C01F 17/34 |
| | | | 501/152 |
| 2023/0335319 A1 | 10/2023 | Tanaka et al. | |

FOREIGN PATENT DOCUMENTS

| | | | |
|---|---|---|---|
| JP | 2008-7385 A | 1/2008 | |
| JP | 4107292 B2 | 6/2008 | |
| JP | 2011-213552 A | 10/2011 | |
| JP | 5611329 B2 | 10/2014 | |
| JP | 5935764 B2 | 6/2016 | |
| JP | 2017-137223 A | 8/2017 | |
| JP | 2019-202916 A | 11/2019 | |
| WO | 2011/132668 A1 | 10/2011 | |
| WO | 2018/193848 A1 | 10/2018 | |
| WO | 2022/054515 A1 | 3/2022 | |
| WO | 2022/054596 A1 | 3/2022 | |

OTHER PUBLICATIONS

International Search Report dated Dec. 13, 2022, issued in counterpart International Application No. PCT/JP2022/040094 (2 pages).

* cited by examiner

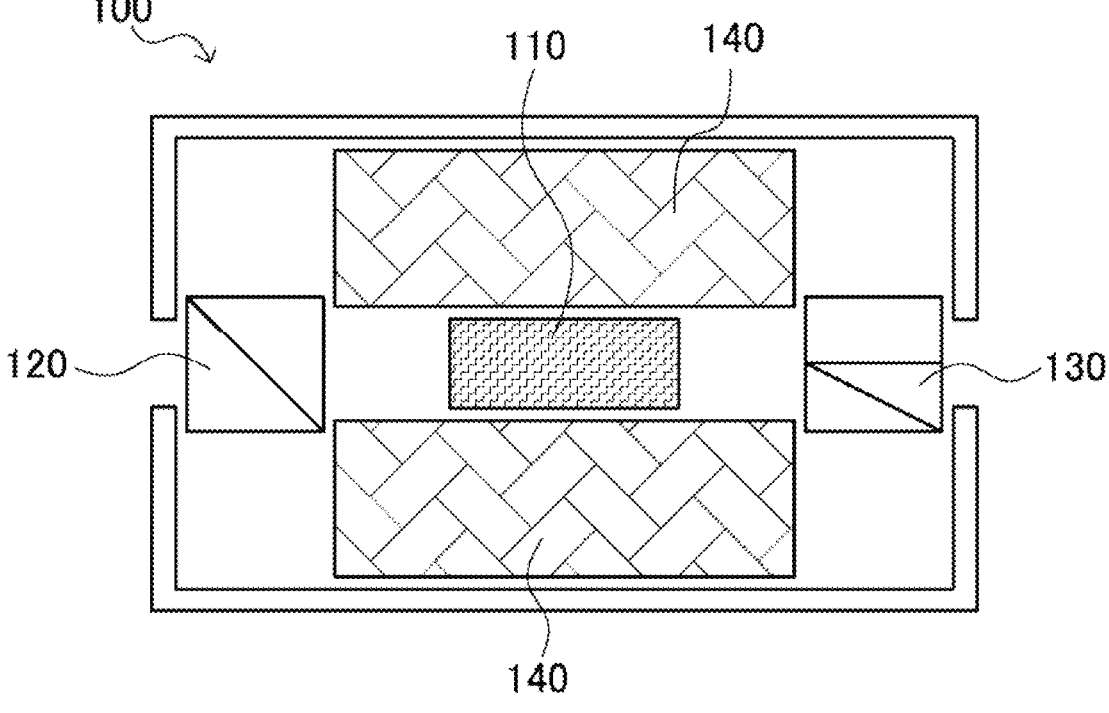

PARAMAGNETIC GARNET-TYPE TRANSPARENT CERAMIC, MAGNETO-OPTICAL MATERIAL, AND MAGNETO-OPTICAL DEVICE

TECHNICAL FIELD

This invention relates to a paramagnetic garnet-type transparent ceramic, and more particularly, to a magneto-optical material suitable for constructing a magneto-optical device such as an optical isolator and composed of a terbium-containing garnet-type transparent ceramic, and to a magneto-optical device including the magneto-optical material.

BACKGROUND ART

Recently, fiber lasers with higher power have been available, and the widespread use of laser processing machines including such fiber lasers has been remarkable. However, laser light sources built into laser processing machines are subject to a phenomenon in which external light entering thereon destabilizes the resonance state and thus disturbs the oscillation state. In particular, the oscillation state is largely disturbed when emitted light is reflected back into the light source by an intermediate optical system. To prevent this, an optical isolator is generally disposed on the light exit side of the light source, for example, between the laser light source and the optical fiber.

An optical isolator is composed of a Faraday rotator, a polarizer disposed on the light entry side of the Faraday rotator, and an analyzer disposed on the light exit side of the Faraday rotator. In addition, the Faraday rotator is used by applying a magnetic field parallel to the travel direction of light. At this time, a polarized fraction of the light rotates only in a certain direction regardless of forward or backward travel through the Faraday rotator. Furthermore, the Faraday rotator is adjusted to a length over which the polarized fraction of the light is rotated by exactly 45 degrees. Here, when the polarization planes of the polarizer and the analyzer are shifted from each other by 45 degrees in the rotation direction of forward-traveling light, the polarization of the forward-traveling light coincides at the position of the polarizer and at the position of the analyzer, thus allowing the forward-traveling light to be transmitted. On the other hand, the polarization of backward-traveling light is rotated by 45 degrees in the direction opposite to the angular direction in which the polarization plane of the polarizer is shifted from the position of the analyzer by 45 degrees. Thus, the polarization plane of return light at the position of the polarizer is shifted from the polarization plane of the polarizer by 45 degrees−(−45 degrees)=90 degrees; therefore, the return light cannot be transmitted through the polarizer. In this way, the optical isolator functions to transmit and output forward-traveling light while blocking backward-traveling return light.

Conventionally known materials for use as the Faraday rotator that constitutes the above optical isolator include TGG crystals ($Tb_3Ga_5O_{12}$) and TSAG crystals (($Tb_{(3-x)}Sc_x$) $Sc_2Al_3O_{12}$) (JP-A 2011-213552 (Patent Document 1) and JP-A 2002-293693 (Patent Document 2)). TGG crystals are widely mounted as a currently standard material for fiber laser systems. On the other hand, TSAG crystals, whose Verdet constant is about 1.3 times that of TGG crystals, are also a material expected to be mounted on fiber laser systems; however, they have not been employed in terms of production cost because Sc is an extremely expensive raw material.

Although there have been continuing efforts to develop TSAG crystals, as in JP 5611329 (Patent Document 3) and JP 5935764 (Patent Document 4), they have not been successful in achieving a reduction in the amount of Sc used, and the use of TSAG crystals has not become widespread.

Besides the above, TAG crystals ($Tb_3Al_5O_{12}$) are also conventionally known as a Faraday rotator with a larger Verdet constant than TSAG. However, TAG crystals are incongruent melting crystals and thus have a constraint in that a perovskite phase forms first at the solid-liquid interface, followed by formation of a TAG phase. That is, a TAG crystal can be grown only in a state in which the garnet phase and the perovskite phase always coexist, and the growth of a large-sized TAG crystal of good quality has not been achieved.

As means for suppressing formation of such mixed crystals, JP 3642063 (Patent Document 5) and JP 4107292 (Patent Document 6) propose a method in which a porous polycrystalline raw material rod for FZ growth or a porous seed crystal is used to preferentially precipitate a perovskite phase, which is the initial phase, in the porous medium. In practice, however, as the melting position moves, the position at which the perovskite phase tends to precipitate also moves; therefore, it is essentially impossible to completely suppress precipitation of the perovskite phase simply by providing a porous interface of a seed crystal or a polycrystalline raw material rod.

Under such constraints, JP-A 2008-007385 (Patent Document 7) proposes the fabrication of a light-transmissive material composed of an oxide ceramic having a TAG composition. Because ceramics can be produced by sintering at temperatures at least 100° C. lower than the melting point, it is possible to overcome the problem of incongruent melting, which has been a problem in single crystal growth. In practice, TAG starts to decompose at 1,840° C. or higher; therefore, a transparent sintered body of a TAG single phase can be obtained if the sintered body can be densified to almost the theoretical density by sintering at or below that temperature.

In Patent Document 7, a method of producing a ceramic having a garnet structure and composed of a terbium aluminum oxide includes a raw material mixing step, a calcining step, a calcined powder grinding step, a forming step, and a firing step. Patent Document 7 teaches that a TAG ceramic with high light transmissivity can be fabricated if the average grain size of the calcined powder after grinding in the calcined powder grinding step is 0.2 to 1.6 μm and the density after forming in the forming step is 3.26 g/cm³ or more.

However, the material in Patent Document 7 has extremely insufficient light transmissivity, and even its linear transmittance for a thickness of 1.5 mm is, at most, 35%. When TAG is used as a Faraday component such as an optical isolator, the component length necessary to rotate, for example, light from a 1.06 μm band laser by 45 degrees is about 15 mm, which corresponds to substantially 10 times the length in the above document. When the component length is increased to 10 times, a material that transmits only 35% of light for a thickness of 1.5 mm would have a transmittance of less than 0.01%, that is, substantially zero, and would therefore no longer function.

That is, although such a ceramic production method can suppress heterophase formation, there has so far been no TAG at a practical level.

Patent Document 6 discloses that a TAG crystal in which Ce ions are substituted for some of the Tb ions has a larger Verdet constant than TAG. A material having a larger Verdet constant requires a shorter component length to rotate incident light by 45 degrees and thus allows for a smaller total amount of light absorbed. Nevertheless, the linear transmittance for a thickness of 1.5 mm is 35%, and even if the component length is halved, the 45-degree rotation thickness transmittance is less than 1%, which is far from a practical level.

Under the aforementioned circumstances, it has recently been disclosed that a dense ceramic sintered body having the composition $(Tb_xY_{1-x})_3Al_5O_{12}$ wherein x=0.5 to 1.0 has a high extinction ratio (an improvement from 35 dB (existing TGG crystals) to 39.5 dB or higher) and a reduced insertion loss (an improvement from 0.05 dB (existing TGG crystals) to 0.01-0.05 dB) as compared with existing TGG crystals (Yan Lin Aung, Akio Ikesue, Development of optical grade $(Tb_xY_{1-x})_3Al_5O_{12}$ ceramics as Faraday rotator material, J. Am. Ceram. Soc., (2017), 100 (9), 4081-4087 (Non-Patent Document 1)). The material disclosed in Non-Patent Document 1 is, first, a ceramic, which eliminates the problem with TGG crystals, that is, the precipitation of perovskite-type heterophase, and also allows for a further reduction in insertion loss through substitution of Y ions for some of the Tb ions, thus being a material from which a garnet-type Faraday rotator of very high quality can be obtained.

Recently, WO 2018/193848 (Patent Document 8) has disclosed a paramagnetic garnet-type transparent ceramic with a linear transmittance of 83% or more at a wavelength of 1,064 nm for an optical path length of 15 mm. This ceramic is a sintered body of a composite oxide having the formula (1):

$$(Tb_{1-x-y}Sc_xCe_y)_3(Al_{1-z}Sc_z)_5O_{12} \tag{1}$$

wherein 0<x<0.08, 0≤y≤0.01, and 0.004<z<0.16.

The material in Patent Document 8 has a Verdet constant similar to that of TAG and exhibits an improvement in linear transmittance for an optical path length of 15 mm, namely, 83% or more, thus having reached a substantially practical level.

PRIOR ART DOCUMENTS

Patent Documents

Patent Document 1: JP-A 2011-213552
Patent Document 2: JP-A 2002-293693
Patent Document 3: JP 5611329
Patent Document 4: JP 5935764
Patent Document 5: JP 3642063
Patent Document 6: JP 4107292
Patent Document 7: JP-A 2008-007385
Patent Document 8: WO 2018/193848
Non-Patent Document 1: Yan Lin Aung, Akio Ikesue, Development of optical grade $(Tb_xY_{1-x})_3Al_5O_{12}$ ceramics as Faraday rotator material, J. Am. Ceram. Soc., (2017), 100 (9), 4081-4087

SUMMARY OF INVENTION

Technical Problem

However, when the inventors actually tested the material in Non-Patent Document 1, it was found that the reproducibility was considerably low and a high-quality ceramic sintered body with a lower insertion loss than TGG crystals was not readily obtained.

In addition, when the inventors reproduced the materials in Examples of Patent Document 8 and actually caused laser light at a wavelength of 1,064 nm whose beam diameter was adjusted to 1.6 mm to impinge on samples of those materials at an incident power of 100 W, it was found that the percent change in the beam diameter of the incident laser light due to thermal lens exceeded 15%. Because it is desirable that the percent change in the beam diameter of incident laser light at a wavelength of 1,064 mm and an incident power of 100 W be 10% or less, it is difficult to say that the material in Patent Document 8 truly has high-power applicability.

An object of the invention, which has been made in view of the aforementioned circumstances, is to provide a truly transparent, highly optically homogeneous paramagnetic garnet-type transparent ceramic composed of a sintered body of a paramagnetic garnet-type oxide containing terbium and yttrium, a magneto-optical material, and a magneto-optical device including the magneto-optical material.

Solution to Problem

To achieve the above object, the invention provides a paramagnetic garnet-type transparent ceramic, a magneto-optical material, and a magneto-optical device, as defined below.

1.

A paramagnetic garnet-type transparent ceramic which is a sintered body of a composite oxide having the formula (1):

$$(Tb_{1-x-y}Y_xSc_y)_3(Al_{1-z}Sc_z)_5O_{12} \tag{1}$$

wherein 0.05≤x≤0.4, 0≤y<0.004, 0.6≤1−x−y<0.95, 0≤z<0.004, and 0.001<y+z<0.005, wherein the paramagnetic garnet-type transparent ceramic contains more than 0% by weight to 0.1% by weight of $SiO_2$ as a sintering aid, has an average sintered grain size of 5 μm or more, has a total light transmittance of 84.0% or more and a forward scatter of 0.5% or less at a wavelength of 1,064 nm for an optical path length of 25 mm, and has a total light transmittance of 84.0% or more and a forward scatter of 0.5% or less at a wavelength of 1,300 nm for an optical path length of 25 mm.

2.

The paramagnetic garnet-type transparent ceramic of 1, having a Verdet constant of 32 rad/(T·m) or more at a wavelength of 1,064 nm.

3.

The paramagnetic garnet-type transparent ceramic of 1 or 2 wherein when laser light of wavelength of 1,064 nm is incident, an extinction ratio over an entire plane within an optical effective diameter thereof for an optical path length of 25 mm is 42 dB or more.

4.

The paramagnetic garnet-type transparent ceramic of any one of 1 to 3, wherein when laser light of wavelength 1,064 nm is incident at a beam diameter of 1.6 mm and an incident power of 100 W, a percent change in its beam diameter of the laser light for an optical path length of 25 mm is 10% or less.

5.

The paramagnetic garnet-type transparent ceramic of any one of 1 to 4, having a thermal conductivity of 4.8 W/(m·K) or more.

6.

A magneto-optical material comprising the paramagnetic garnet-type transparent ceramic of any one of 1 to 5.

7.

A magneto-optical device constructed using the magneto-optical material of 6.

8.

The magneto-optical device of 7 which is an optical isolator comprising a Faraday rotator composed of the paramagnetic garnet-type transparent ceramic and polarizers disposed forward and backward of the Faraday rotator on an optical axis thereof, the optical isolator being usable in a wavelength band of from 0.9 μm to 1.1 μm.

Advantageous Effects of Invention

According to the invention, there can be provided a truly transparent, highly optically homogeneous paramagnetic garnet-type transparent ceramic which is a paramagnetic garnet-type oxide containing terbium and yttrium. Furthermore, the paramagnetic garnet-type transparent ceramic is applicable to high-power laser systems with a power of 100 W or more because the ceramic has high thermal conductivity and good optical homogeneity, and is also easy to scale up because the ceramic is a ceramic sintered body, thus being truly practical.

BRIEF DESCRIPTION OF DRAWINGS

FIG. 1 is a schematic sectional view of an example configuration of an optical isolator constructed using a magneto-optical material according to the invention as a Faraday rotator.

DESCRIPTION OF EMBODIMENTS

<Paramagnetic Garnet-Type Transparent Ceramic>

A paramagnetic garnet-type transparent ceramic according to the invention will be described below.

The transparent ceramic material according to the invention is a sintered body of a composite oxide having the formula (1):

$$(Tb_{1-x-y}Y_xSc_y)_3(Al_{1-z}Sc_z)_5O_{12} \qquad (1)$$

wherein $0.05 \leq x \leq 0.4$, $0 \leq y < 0.004$, $0.6 \leq 1-x-y < 0.95$, $0 \leq z < 0.004$, and $0.001 < y+z < 0.005$. The paramagnetic garnet-type transparent ceramic contains more than 0% by weight to 0.1% by weight of $SiO_2$ as a sintering aid, has an average sintered grain size of 5 μm or more, has a total light transmittance of 84.0% or more and a forward scatter of 0.5% or less at a wavelength of 1,064 nm for an optical path length of 25 mm, and has a total light transmittance of 84.0% or more and a forward scatter of 0.5% or less at a wavelength of 1,300 nm for an optical path length of 25 mm.

In formula (1), terbium (Tb) is a material which has the largest Verdet constant of paramagnetic elements excluding iron (Fe) and, in particular, is completely transparent at a wavelength of 1,064 nm when contained in an oxide having a garnet structure, thus being an element best suited for use in an optical isolator for this wavelength region.

Yttrium (Y) is a material which has an ionic radius that is about 2% smaller than that of terbium and, when combined with aluminum to form a composite oxide, can form a garnet phase more stably than it forms a perovskite phase and can also reduce residual strain in crystallites. Yttrium can therefore prevent scattering by heterophase, a decrease in extinction ratio due to internal stress, and absorption due to f-f transition of terbium ions, thus being an important constituent element in the invention. Furthermore, when yttrium ions are substituted for some of the terbium ions, yttrium levels the sinterability (a combination reaction and a rapid phase change during a temperature rise and the resulting rapid change in specific gravity) and can therefore limit the amount of pores remaining in the ceramic sintered body more effectively than without substitution with yttrium ions, thus being a suitable constituent element in the invention.

Aluminum (Al) is a material which has the smallest ionic radius of trivalent ions that can exist stably in an oxide having a garnet structure and is an element which can most reduce the lattice constant of a terbium-containing paramagnetic garnet-type oxide. It is preferable that the lattice constant of the garnet structure can be reduced without changing the terbium content because the Verdet constant per unit length can be increased. In practice, the Verdet constant of TAG increases to 1.25 to 1.5 times that of TGG. Therefore, even when the relative concentration of terbium is reduced by substituting yttrium ions for some of the terbium ions, aluminum can maintain the Verdet constant per unit length at a level equal to or slightly below that of TGG, thus being a suitable constituent element in the invention.

Scandium (Sc) is a material which has an intermediate ionic radius and can therefore form a solid solution at both terbium sites and some aluminum sites in an oxide having a garnet structure, and is a buffer material which, when the blend ratio of rare earth elements, including terbium and yttrium, to aluminum shifts from the stoichiometric ratio due to variations in weighing, can form a solid solution while adjusting its distribution ratio between rare earth sites, including terbium sites and yttrium sites, and aluminum sites so as to exactly match the stoichiometric ratio and thereby minimize the crystallite creation energy. Scandium is also an element which has a precipitation-suppressing effect on alumina heterophase and perovskite-type heterophase, thus being an essential element in the invention.

However, because scandium can quite readily form a solid solution at both terbium sites and aluminum sites, increasing the amount of scandium added without careful consideration, that is, significantly increasing the proportion of scandium in the mixture of the raw materials, inevitably results in a noticeable effect of variations in scandium concentration, thus forming a collection of sintered grains in which the amount of scandium forming a solid solution at terbium sites and aluminum sites differs for each sintered grain in the sintered body after the sintering step. As a result, the following problems occur: (i) the effective refractive index varies for each sintered grain, and the sintered body as a whole exhibits worse forward scatter due to variations in refractive index; and (ii) scandium has an excessive sintering-suppressing effect and thus hinders the process through which the sintered body becomes more homogeneous as the grains coalesce into larger ones. This makes it difficult to reduce the surface area of the grain boundaries and results in strain and slight interfacial scattering being preserved in the sintered body, thus leading to a local decrease in extinction ratio as well as a local decrease in thermal conductivity and the resulting decrease in average thermal conductivity (average value of thermal conductivity). In this case, for example, when there is a local decrease in thermal conductivity, the percent change in the beam diameter of laser light entering at an incident power of 100 W increases to 15% or more, which is undesirable.

In view of the above contradictory properties, it is preferred to find the minimum possible range of amounts of scandium added in which the heterophase-precipitation suppressing effect is maintained and to control the amount of scandium added in that range.

In formula (1), x is in the range of $0.05 \leq x \leq 0.4$, preferably $0.06 \leq x \leq 0.3995$, even more preferably $0.1 \leq x \leq 0.399$. A value of x in this range allows the perovskite-type heterophase to be reduced to a level undetectable by X-ray diffraction (XRD) analysis.

A value of x below 0.05 is undesirable because such conditions cannot provide the effect of substituting yttrium ions for some of the terbium ions and are substantially identical to the conditions for fabrication of TAG, which makes it difficult to stably produce a low-scattering, low-absorption high-quality ceramic sintered body. On the other hand, a value of x above 0.4 is undesirable because the Verdet constant at a wavelength of 1,064 nm falls below 32 rad/(T·m). Furthermore, too low a relative concentration of terbium is undesirable because the overall length necessary to rotate laser light at a wavelength of 1,064 nm by 45 degrees increases above 25 mm, which makes production difficult.

In formula (1), y is in the range of $0 \leq y < 0.004$, preferably $0.0005 \leq y < 0.004$, more preferably $0.001 \leq y < 0.004$. A value of y in this range is preferred because the perovskite-type heterophase can be reduced to a level undetectable by X-ray diffraction (XRD) analysis. A value of y in this range is also preferred because an excessive decrease in thermal conductivity due to the homogeneity of the sintered body and grain boundary scattering can be prevented.

A value of y of 0.004 or more is undesirable because, while the precipitation-suppressing effect on perovskite-type heterophase or alumina heterophase becomes saturated and no longer changes, sintering variations, sintering strain, or grain boundary scattering remains due to an excessive sintering-suppressing effect of scandium, thus leading to a local decrease in extinction ratio and a decrease in the average value of thermal conductivity.

In formula (1), 1−x−y is in the range of $0.6 \leq 1-x-y < 0.95$, more preferably $0.6 \leq 1-x-y < 0.899$. A value of 1−x−y in this range allows the ceramic to have a large Verdet constant and high transparency at a wavelength of 1,064 nm.

In formula (1), z is in the range of $0 \leq z < 0.004$, more preferably $0.0005 \leq z < 0.004$, even more preferably $0.001 \leq z < 0.004$. A value of z in this range is preferred because the perovskite-type heterophase can be reduced to a level undetectable by X-ray diffraction (XRD) analysis. A value of z in this range is also preferred because an excessive decrease in thermal conductivity due to the homogeneity of the sintered body and grain boundary scattering can be prevented.

A value of z of 0.004 or more is undesirable because, while the precipitation-suppressing effect on perovskite-type heterophase or alumina heterophase becomes saturated and no longer changes, sintering variations, sintering strain, or grain boundary scattering remains due to an excessive sintering-suppressing effect of scandium, thus leading to a local decrease in extinction ratio and a decrease in the average value of thermal conductivity.

In formula (1), y+z is in the range of $0.001 < y+z < 0.005$, more preferably $0.0015 < y+z < 0.005$, even more preferably $0.002 < z < 0.005$. A value of y+z in this range is preferred because the perovskite-type heterophase can be reduced to a level undetectable by X-ray diffraction (XRD) analysis. A value of y+z in this range is also preferred because an excessive decrease in thermal conductivity due to the homogeneity of the sintered body and grain boundary scattering can be prevented.

A value of y+z of 0.001 or less is undesirable because there is an increased risk of precipitation of perovskite-type heterophase or alumina heterophase. On the other hand, a value of y+z of 0.005 or more is undesirable because, while the precipitation-suppressing effect on perovskite-type heterophase or alumina heterophase becomes saturated and no longer changes, sintering variations, sintering strain, or grain boundary scattering remains due to an excessive sintering-suppressing effect of scandium, thus leading to a local decrease in extinction ratio and a decrease in the average value of thermal conductivity.

The paramagnetic garnet-type transparent ceramic of the invention contains as a major component the composite oxide having formula (1) above and also contains as a minor component $SiO_2$, which serves as a sintering aid, in an amount of 0.1% by weight or less. The addition of a slight amount of $SiO_2$ as a sintering aid suppresses precipitation of perovskite-type heterophase, alumina heterophase, or the like and thus further improves the transparency of the paramagnetic garnet-type transparent ceramic. Furthermore, the slight amount of $SiO_2$ added vitrifies during sintering at 1,400° C. or higher and produces a liquid-phase sintering effect by which the densification of the garnet-type ceramic sintered body can be promoted. However, the addition of $SiO_2$ in an amount of more than 0.1% by weight is undesirable because the percent change in the beam diameter of a 100 W laser beam at a wavelength of 1,064 nm exceeds 10% when the laser light is incident at a beam diameter of 1.6 mm on a paramagnetic garnet-type transparent ceramic with a length (optical path length) of 25 mm.

"Contains as a major component" means that the paramagnetic garnet-type transparent ceramic contains the composite oxide having formula (1) above in an amount of 90% by weight or more. The content of the composite oxide having formula (1) is preferably 99% by weight or more, more preferably 99.9% by weight or more, even more preferably 99.99% by weight or more, particularly preferably 99.999% by weight or more.

Although the paramagnetic garnet-type transparent ceramic of the invention is composed of the above major and minor components, the paramagnetic garnet-type transparent ceramic may further contain other elements. Typical examples of other elements include rare earth elements such as lutetium (Lu) and cerium (Ce) and a group of various impurities (incidental components) such as sodium (Na), calcium (Ca), magnesium (Mg), phosphorus (P), tungsten (W), and molybdenum (Mo).

The contents of other elements are preferably 10 parts by weight or less, more preferably 0.1 parts by weight or less, particularly preferably 0.001 parts by weight or less (substantially zero), with the total amount of Tb and Y being 100 parts by weight.

The paramagnetic garnet-type transparent ceramic of the invention has an average sintered grain size of 5 μm or more, preferably 5.5 μm or more. Although there is no particular upper limit on the average sintered grain size of the paramagnetic garnet-type transparent ceramic of the invention, the average sintered grain size is typically 30 μm or less. An average sintered grain size of less than 5 μm increases the risk of the thermal conductivity falling below 4.8 W/(m·K).

As used herein, the average sintered grain size of the paramagnetic garnet-type transparent ceramic is the average crystal grain size of a secondary sintered body after HIP treatment in the method of production described later, and can be determined by directly observing a polished surface thereof, for example, under a microscope. One example is a backscattered electron image of an electron microscope (SEM). When the grain size is difficult to determine in the polished surface, the grain boundaries may be made clear by thermal etching at 1,200° C. to 1,300° C. or by treatment with 0.1 M dilute hydrochloric acid. The crystal grain size (magnitude of grain size) can be determined by the following equation ("Lineal Intercept Technique for Measuring Grain Size in Two-Phase Polycrystalline Ceramics" Journal of the American Ceramic Society, 55, 109 (1972)):

$$D=1.56C/(MN)$$

wherein C is the length of a line arbitrarily drawn on a high-resolution image such as a SEM image, N is the number of grains on the line, and M is the image magnification.

In this case, N is preferably 10 or more, more preferably 100 or more.

The paramagnetic garnet-type transparent ceramic of the invention looks colorless and transparent, has a total light transmittance of 84.0% or more and a forward scatter of 0.5% or less at a wavelength of 1.064 nm for an optical path length of 25 mm, and has a total light transmittance of 84.0% or more and a forward scatter of 0.5% or less at a wavelength of 1,300 nm for an optical path length of 25 mm. It is preferred that the paramagnetic garnet-type transparent ceramic of the invention not only have high transmittance at the wavelength (1.064 nm) intended to be used, but also have, as in the case of a wavelength of 1,064 nm, a total light transmittance of 84.0% or more and a forward scatter of 0.5% or less in a wavelength band longer than the wavelength intended to be used. This is because the extinction ratio improves, the percent change in the beam diameter of a 100 W laser beam at a wavelength of 1,064 nm for an optical path length of 25 mm is 10% or less when the laser beam is incident at a beam diameter of 1.6 mm, and the thermal conductivity is 4.8 W/(m·K) or more.

In the invention, "total light transmittance" refers to the proportion (total light transmittance) of the integrating sphere intensity of light at the wavelength of interest after transmission through a transparent ceramic sample, with the integrating sphere transmission spectrum (light intensity) at the wavelength of interest as measured in a blank (empty space) state in which no sample is placed in the measurement optical path being 100%. Specifically, the total light transmittance can be expressed as $I/I_0 \times 100(\%)$, wherein $I_0$ is the intensity (incident light intensity) of light at the wavelength of interest as measured in the blank state, and I is the intensity of light, including scattered light, collected by an integrating sphere after transmission through the transparent ceramic sample (the same applies to Examples below). In addition, "forward scatter" is defined as follows. Specifically, after the "total light transmittance" is measured in a state in which the sample is placed on the measurement optical path, an exit window located opposite an entrance window of the integrating sphere is opened. In this state, light is made incident on the sample again. Of the light components leaving the sample, only transmitted light traveling straight without being scattered is released outside the integrating sphere, and only light slightly scattered in the transparent ceramic sample and entering the integrating sphere at an angle is received, and the intensity Is thereof measured. The light intensity that can be expressed as $I_s/I_0 \times 100(\%)$ using $I_0$ above is the "forward scatter" of the sample of interest (the same applies to Examples below).

The paramagnetic garnet-type transparent ceramic of the invention preferably has a Verdet constant of 32 rad/(T·m) or more, more preferably 36 rad/(T·m) or more, at a wavelength of 1,064 nm. A Verdet constant of 32 rad/(T·m) or more allows compatibility with an isolator including a TGG single crystal to be achieved without increasing the outer size of the entire isolator by design and modification of an outer cylindrical magnet. A Verdet constant of 36 rad/(T·m) or more allows substitution for a TGG single crystal, which is an existing material, to be easily performed without changing the component design.

The paramagnetic garnet-type transparent ceramic of the invention preferably has, as a Faraday rotator (ceramic component alone), an extinction ratio of 42 dB or more at a wavelength of 1,064 nm for an optical path length of 25 mm. In particular, the paramagnetic garnet-type transparent ceramic of the invention preferably has an extinction ratio of 42 dB or more, more preferably 44 dB or more, even more preferably 45 dB or more, for an optical path length of 25 mm over the entire plane within the optical effective diameter thereof when laser light of wavelength of 1,064 nm is incident. Within the garnet composition range of the invention, a transparent ceramic sintered body is obtained that has reduced local strain and that is homogeneous and exhibits less grain boundary scattering over the entire optical effective plane because no excessive grain growth suppression occurs. Thus, as a Faraday rotator (ceramic component alone), the extinction ratio at a wavelength of 1,064 nm for an optical path length of 25 mm over the entire plane within the optical effective diameter can be stably controlled to 42 dB or more.

As used herein. "extinction ratio" is the value determined as follows (the same applies to Examples below). Laser light of wavelength of 1,064 nm and a power of 10 to 20 mW is polarized to 0 to 90 degrees and is incident perpendicularly (in the axial direction to be optically used) on an optical surface of the paramagnetic garnet-type transparent ceramic of interest in a state in which the beam diameter thereof is expanded to the diameter corresponding to the entire plane within the optical effective diameter of the optical surface of the paramagnetic garnet-type transparent ceramic of interest. Light leaving the ceramic passes through a polarizer and is incident on a photodetector, and the light intensity is measured by the photodetector. The extinction ratio is calculated from the maximum value ($I_0'$) and the minimum value (I') by the following equation:

$$\text{Extinction ratio (dB/25 mm)} = -10 \times \log_{10}\left(I' / I_0'\right)$$

In addition, "optical effective diameter" refers to an optically effective region (optical effective region) of an optical surface of a transparent ceramic. Specifically, in the case of a cylindrical paramagnetic garnet-type transparent ceramic, "optical effective diameter" refers to a region of an optical surface (circular surface) on the axis to be optically used excluding a peripheral portion of the end surface which cannot be optically used. Here, "optical effective diameter" refers a region excluding the peripheral portion of the optical surface, which accounts for 10% of the area of the optical surface, that is, a region which is located inside the outer periphery of the optical surface and which accounts for 90% of the area of the optical surface. In addition. "optically effective region" refers to a region which functions effectively as a magneto-optical material when incident light passes through and leaves the paramagnetic garnet-type transparent ceramic.

In addition, the percent change in the beam diameter of laser light at a wavelength of 1,064 nm for an optical path length of 25 mm is preferably 10% or less, more preferably 9% or less, even more preferably 8% or less, when the laser light is incident at a beam diameter of 1.6 mm and an incident power of 100 W on the paramagnetic garnet-type transparent ceramic of the invention. A percent change in beam diameter of 10% or less allows the energy density at the machining point in making, scribing, or other precise laser machining to fall within the limits of the specifications and thus allows the paramagnetic garnet-type transparent ceramic to be substantially usable for 100 W high-power laser systems.

"Percent change in beam diameter" above can be determined as follows.

Specifically, when laser light (spatially parallel beam) at a wavelength of 1,064 nm and an output power of 100 W which is collimated to a diameter 1.6 mm is incident on an optical surface of the paramagnetic garnet-type transparent ceramic of interest, the beam diameter of the light (incident light) is measured with a beam profiler. This value is referred to as $r_0$. Next, the beam diameter of the light (transmitted light) transmitted through the paramagnetic garnet-type transparent ceramic of interest, which has a length of 25 mm, is measured as r. The percent change in beam diameter is calculated as $(1-r/r_0)\times100(\%)$. The percent change in beam diameter varies with, for example, the position and angle at which the paramagnetic garnet-type transparent ceramic of interest is set in the measurement system as well as daily errors; therefore, it is preferred to measure the percent change in beam diameter with the paramagnetic garnet-type transparent ceramic of interest being set at different positions and angles in the measurement system during measurement, and to measure the percent change in beam diameter several times (at least twice) on different days and use the maximum value of the measurements as the percent change in beam diameter.

The paramagnetic garnet-type transparent ceramic of the invention preferably has a thermal conductivity of 4.8 W/(m·K) or more. As used herein, the thermal conductivity is measured by laser flash analysis in accordance with JIS R 1611 and is the average heat transfer coefficient described above. However, a sample for thermal conductivity evaluation by laser flash analysis need not have an elongated shape with an optical path length of 25 mm, which is assumed for use as a magneto-optical material; rather, a thickness of about 1 mm and an outer diameter of about 10 mm are sufficient for thermal conductivity measurement. However, it is necessary to form a sample for thermal conductivity evaluation whose method of production is common to that of the magneto-optical paramagnetic garnet-type transparent ceramic except that only the shape of the formed body is changed. This sample for thermal conductivity evaluation can be used for measurement to determine the thermal conductivity of the magneto-optical paramagnetic garnet-type transparent ceramic.

<Method of Producing Paramagnetic Garnet-Type Transparent Ceramic>

[Raw Material]

Examples of raw materials that can be suitably used in the invention include metal powders of terbium, yttrium, scandium, and aluminum, those metal powders dissolved in aqueous solutions such as nitric acid, sulfuric acid, and uric acid, and oxide powders of the above elements. Co-precipitates of the above elements can also be suitably used as raw materials. The above raw materials preferably have a purity of 99.9% by weight or more, particularly preferably 99.99% by weight or more.

A starting raw material can be prepared by weighing predetermined amounts of those elements so as to have a composition corresponding to formula (1) and mixing them together. Alternatively, a fired raw material composed mainly of a cubic garnet-type oxide of a desired structure may be obtained by firing the mixture of the predetermined amounts of raw materials weighed, and the fired raw material may be ground into a powder form and used as a starting raw material. In this case, the firing temperature is preferably 950° C. or higher and below the temperature of subsequent sintering, more preferably 1,100° C. or higher and below the temperature of subsequent sintering. As used herein, "composed mainly of" means that a main peak obtained from the results of powder X-ray diffraction on the fired raw material is composed of a diffraction peak assigned to the garnet structure. When the proportion of perovskite-type heterophase and alumina heterophase to the garnet matrix is 1% or less, even the main peaks of their powder X-ray diffraction patterns are almost undetectable, and the results of powder X-ray diffraction are substantially very close to the pattern of a garnet single phase.

The powder form of the above starting raw material is not particularly limited, and powders such as angular, spherical, and plate-like powders can be suitably used. In addition, powders in the form of secondary aggregates can be suitably used, and granular powders obtained by granulation treatment such as spray drying treatment can also be suitably used. Furthermore, the step of preparing the powder of the starting raw material is not particularly limited. Raw material powders prepared by co-precipitation, grinding, spray thermal decomposition, the sol-gel method, alkoxide hydrolysis, and other various synthesis methods can be suitably used. In addition, the resulting raw material powder may be treated as appropriate on a wet ball mill, a bead mill, a jet mill, a dry jet mill, a hammer mill, or the like.

Various organic additives may be added to the garnet-type oxide powder raw material used in the invention for the purpose of improving the quality stability and yield in the subsequent ceramic production process. These are also not particularly limited in the invention. Specifically, various dispersing agents, binders, lubricants, plasticizers, and the like can be suitably used. However, as these organic additives, it is preferred to select those of high purity type that are free of unnecessary metal ions.

[Production Process]

In the invention, the above starting raw material is pressed into a predetermined shape, is debinded, and is then sintered to form a sintered body densified to a relative density of at least 94% or more. As the subsequent step, hot isostatic pressing (HIP) treatment is preferably performed. However, directly performing hot isostatic pressing (HIP) treatment reduces the paramagnetic garnet-type transparent ceramic and generates some oxygen deficits therein. Therefore, it is preferred to recover oxygen deficits by slightly oxidative HIP treatment, or by annealing treatment (oxidative annealing treatment) in an oxidizing atmosphere after HIP treatment. Thus, a transparent garnet-type oxide ceramic without defect absorption can be obtained.

(Forming)

In the method of production of the invention, a common pressing step can be suitably used. Specifically, a common step such as a uniaxial pressing step, in which a powder is charged into a mold and is pressed in one direction, or a cold isostatic pressing (CIP) or warm isostatic pressing (WIP) step, in which a powder is placed and sealed in a deformable water-proof vessel and is pressed under isostatic pressure, can be suitably used. The applied pressure may be adjusted as appropriate while monitoring the relative density of the resulting formed body. Although the applied pressure is not particularly limited, it is preferred to control the applied pressure in the range of, for example, about 300 MPa or less, which can be supported by a commercially available CIP or WIP system, because the production cost can be reduced. Alternatively, a hot pressing step, in which forming to sintering steps are continuously performed, a spark plasma sintering step, a microwave heating step, or the like can also be suitably used. Instead of a pressing method, a casting method can also be used to produce the formed body. Forming methods such as pressure casting, centrifugal casting, and extrusion molding can also be used by optimizing the combination of the shape and size of the oxide powder used as the starting raw material with various organic additives.

(Debinding)

In the method of production of the invention, a common debinding step can be suitably used. Specifically, a step of debinding by heating in a heating furnace can be performed. In addition, the type of atmosphere gas used in this step is not particularly limited, and air, oxygen, hydrogen, or the like can be suitably used. The debinding temperature is also not particularly limited; however, if a raw material containing organic additives is used, the raw material is preferably heated to a temperature at which the organic components can be decomposed and eliminated.

(Sintering)

In the method of production of the invention, a common sintering step can be suitably used. Specifically, a step of sintering by heating such as resistance heating or induction heating can be suitably used. The atmosphere used in this step is not particularly limited, and sintering can be performed in various atmospheres such as inert gases, oxygen gas, hydrogen gas, and helium gas, and can also be performed under reduced pressure (in a vacuum). However, a more preferred atmosphere is an oxygen gas or reduced-pressure oxygen gas atmosphere because it is preferred to ultimately prevent generating oxygen deficits in the sintered body.

The sintering temperature in the sintering step is preferably 1,500° C. to 1,780° C., particularly preferably 1,550° C. to 1,750° C. A sintering temperature in this range is preferred because densification is promoted while suppressing heterophase precipitation.

Although a holding time on the order of several hours is sufficient for sintering in the sintering step, the sintered body needs to be densified to a relative density of at least 94% or more. In addition, it is more preferred to densify the sintered body to a relative density of 99% or more by holding for 10 hours or more because the final transparency improves.

(Hot Isostatic Pressing (HIP))

In the method of production of the invention, a step of performing hot isostatic pressing (HIP) treatment can be additionally provided after the sintering step.

An inert gas such as argon or nitrogen or Ar—O₂ can be suitably used as the type of pressure gas medium in this step. The pressure applied by the pressure gas medium is preferably 50 to 300 MPa, more preferably 100 to 300 MPa. A pressure below 50 MPa may be insufficient to provide a transparency-improving effect, whereas increasing the pressure above 300 MPa does not provide any further improvement in transparency and may impose an excessive load on the system and may thus damage the system. An applied pressure of 196 MPa or less, which can be supported by a commercial HIP system, is preferred in terms of simplicity.

The treatment temperature (predetermined holding temperature) in this step is set in the range of 1,100° C. to 1,780° C., preferably 1,200° C. to 1,730° C. A heat treatment temperature above 1,780° C. is undesirable because there is a risk of generating oxygen deficits. On the other hand, a heat treatment temperature below 1,100° C. provides substantially no transparency-improving effect on the sintered body. Although the holding time at the heat treatment temperature is not particularly limited, too long a holding time is undesirable because the risk of generating oxygen deficits increases. Typically, the holding time is preferably set in the range of 1 to 3 hours.

Although the heater material, the thermal insulation material, and the treatment vessel for the HIP treatment are not particularly limited, graphite, molybdenum (Mo), tungsten (W), or platinum (Pt) can be suitably used. Furthermore, yttrium oxide or gadolinium oxide can be suitably used for the treatment vessel. In particular, when the treatment temperature is 1,500° C. or lower, platinum (Pt) can be used for the heater material, the thermal insulation material, and the treatment vessel. Platinum (Pt) is preferred because Ar—O₂ can be used as the pressure gas medium and thus generating oxygen deficits can be prevented during the HIP treatment. When the treatment temperature is higher than 1,500° C., graphite is preferred for the heater material and the thermal insulation material. In this case, it is preferred to select graphite, molybdenum (Mo), or tungsten (W) for the treatment vessel and yttrium oxide or gadolinium oxide for an inner liner to form a double-wall vessel and to charge the vessel with an oxygen release material because the amount of oxygen deficits generated during the HIP treatment can be minimized.

(Oxidative Annealing)

In the method of production of the invention, after the completion of the HIP treatment, the resulting transparent ceramic sintered body (HIP body) may look slightly gray due to oxygen deficits generated therein. In this case, oxidative annealing treatment (oxygen deficit-recovering treatment) is preferably performed in an oxygen atmosphere at the HIP treatment temperature or lower, typically 1,000° C. to 1,500° C., preferably higher than 1,300° C. to 1,500° C., more preferably 1,350° C. to 1,500° C., even more preferably 1.400° C. to 1,500° C. Although the holding time in this case is not particularly limited, it is preferred to select a holding time that is at least long enough to recover oxygen deficits but is not so long as to result in wasteful consumption of electricity. Even transparent ceramic sintered bodies that look slightly gray after the HIP treatment step can be subjected to the oxidative annealing treatment so that all the paramagnetic garnet-type transparent ceramics are colorless and transparent without defect absorption.

(Optical Polishing)

In the method of production of the invention, the paramagnetic garnet-type transparent ceramic after the series of steps is preferably subjected to optical polishing at both end surfaces thereof on the axis to be optically used. In this case, the optical surface accuracy is preferably λ/2 or less, particularly preferably λ/8 or less, wherein measurement wavelength λ=633 nm. An antireflective coating can also be deposited on the optically polished surfaces as appropriate to further reduce the optical loss.

In this way, the above-described paramagnetic garnet-type transparent ceramic of the invention can be provided. Specifically, the paramagnetic garnet-type transparent ceramic is a sintered body of a composite oxide containing terbium and yttrium and having formula (1) above. The paramagnetic garnet-type transparent ceramic contains more than 0% by weight to 0.1% by weight of SiO₂ as a sintering aid, has an average sintered grain size of 5 μm or more, has a total light transmittance of 84.0% or more and a forward scatter of 0.5% or less at a wavelength of 1,064 nm for a length (optical path length) of 25 mm, and has a total light transmittance of 84.0% or more and a forward scatter of 0.5% or less at a wavelength of 1,300 nm for a length (optical path length) of 25 mm. In addition, the thus-obtained paramagnetic garnet-type transparent ceramic preferably has a Verdet constant of 32 rad/(T·m) or more at a wavelength of 1,064 nm. Preferably, the percent change in the beam diameter of laser light at a wavelength of 1,064 nm for an optical path length of 25 mm is 10% or less when the laser light is incident at a beam diameter of 1.6 mm and an incident power of 100 W. More preferably, the paramagnetic garnet-type transparent ceramic has a thermal conductivity of 4.8 W/(m·K) or more. Also preferably, as a Faraday rotator (ceramic component alone), the paramagnetic garnet-type transparent ceramic has an extinction ratio of 42 dB or more for an optical path length of 25 mm over the entire plane within the optical effective diameter thereof when laser light at a wavelength of 1,064 nm is incident.

(Magneto-Optical Device)

Furthermore, because the paramagnetic garnet-type transparent ceramic of the invention is intended for use as a magneto-optical material, it is preferred to construct and use a magneto-optical device in which a magnetic field is applied to the paramagnetic garnet-type transparent ceramic in a direction parallel to the optical axis thereof and in which a polarizer and an analyzer are set with the optical axes thereof shifted from each other by 45 degrees. That is, the magneto-optical material of the invention is suitable for use in a magneto-optical device and is particularly suitable for use as a Faraday rotator in an optical isolator for a wavelength of 0.9 to 1.1 μm.

FIG. 1 is a schematic sectional view of an example of an optical isolator serving as an optical device including a Faraday rotator composed of the magneto-optical material of the invention as an optical component. In FIG. 1, an optical isolator 100 includes a Faraday rotator 110 composed of the magneto-optical material of the invention and a polarizer 120 and an analyzer 130, both being polarizers, disposed forward and backward of the Faraday rotator 110. In addition, the optical isolator 100 preferably has the polarizer 120, the Faraday rotator 110, and the analyzer 130 arranged in that order and has a magnet 140 disposed on at least one of the side surfaces thereof.

In addition, the above optical isolator 100 can be suitably used for industrial fiber laser systems. That is, the optical isolator 100 is suitable for preventing laser light emitted from a laser light source from being reflected back into the light source and thereby destabilizing oscillation.

EXAMPLES

Examples and Comparative Examples are given below to further illustrate the invention, although the invention is not limited thereto.

Examples 1 to 7 and Comparative Examples 1 to 6

A terbium oxide powder, an yttrium oxide powder, and a scandium oxide powder manufactured by Shin-Etsu Chemical Co., Ltd. and an aluminum oxide powder manufactured by Taimei Chemical Co., Ltd. were obtained. Furthermore, a tetraethyl orthosilicate (TEOS) liquid manufactured by Kishida Chemical Co., Ltd. was obtained. All the powder raw materials had a purity of 99.95% by weight or more, and the liquid raw material had a purity of 99.999% by weight or more.

The above raw materials were used to prepare 13 oxide raw materials having the final compositions shown in Table 1 by adjusting the mixing ratio.

Specifically, mixed powders were prepared by weighing the raw materials such that the numbers of moles of terbium, yttrium, aluminum, and scandium were in the molar ratios of the compositions in Table 1. TEOS was then weighed and added to the raw materials such that the amount of TEOS added was as shown in percent by weight on a $SiO_2$ basis in Table 1.

The raw materials were subjected to dispersion and mixing treatment in ethanol on an alumina ball mill with care to prevent contamination with each other. The treatment time was 15 hours. Subsequently, spray drying treatment was performed to prepare granular raw materials having an average grain size of 20 μm.

These powders were then placed in an yttria crucible and were subjected to firing treatment in a high-temperature muffle furnace at 1,100° C. for a holding time of 3 hours to obtain fired raw materials having the respective compositions. The resulting fired raw materials were subjected to diffraction pattern analysis (XRD analysis) with a powder X-ray diffractometer manufactured by PANalytical. The crystal system of each sample was determined from a comparison between reference data for an X-ray diffraction pattern and the measured pattern. In most cases (oxide raw material Nos. 1 to 8 and 10 to 13), only the peak of a garnet single phase (cubic) was detected. For oxide raw material No. 9, a weak peak of perovskite-type heterophase was detected in addition to the peak pattern of a garnet phase.

The results are shown together in Table 1.

TABLE 1

| Oxide raw material No. | Composite oxide composition | Sintering aid $SiO_2$ (% by weight) | XRD analysis |
|---|---|---|---|
| 1 | $(Tb_{0.9485}Y_{0.05}Sc_{0.0015})_3(Al_{0.999}Sc_{0.001})_5O_{12}$ | 0.01 | Garnet |
| 2 | $(Tb_{0.899}Y_{0.0995}Sc_{0.0015})_3(Al_{0.999}Sc_{0.001})_5O_{12}$ | 0.01 | Garnet |
| 3 | $(Tb_{0.799}Y_{0.1995}Sc_{0.0015})_3(Al_{0.999}Sc_{0.001})_5O_{12}$ | 0.01 | Garnet |
| 4 | $(Tb_{0.699}Y_{0.2995}Sc_{0.0015})_3(Al_{0.999}Sc_{0.001})_5O_{12}$ | 0.01 | Garnet |
| 5 | $(Tb_{0.601}Y_{0.3975}Sc_{0.0015})_3(Al_{0.999}Sc_{0.001})_5O_{12}$ | 0.01 | Garnet |
| 6 | $(Tb_{0.799}Y_{0.1975}Sc_{0.0035})_3(Al_{0.9965}Sc_{0.0035})_5O_{12}$ | 0.02 | Garnet |
| 7 | $(Tb_{0.601}Y_{0.3985}Sc_{0.0005})_3(Al_{0.9994}Sc_{0.0006})_5O_{12}$ | 0.05 | Garnet |
| 8 | $(Tb_{0.98}Y_{0.0185}Sc_{0.0015})_3(Al_{0.999}Sc_{0.001})_5O_{12}$ | 0.03 | Garnet |
| 9 | $(Tb)_3(Al)_5O_{12}$ | 0.05 | Garnet + perovskite |
| 10 | $(Tb_{0.8}Y_{0.2})_3(Al)_5O_{12}$ | 0.08 | Garnet |
| 11 | $(Tb_{0.6}Y_{0.4})_3(Al)_5O_{12}$ | 0.08 | Garnet |
| 12 | $(Tb_{0.58}Y_{0.4185}Sc_{0.0015})_3(Al_{0.999}Sc_{0.001})_5O_{12}$ | 0.01 | Garnet |
| 13 | $(Tb_{0.799}Y_{0.1995}Sc_{0.0015})_3(Al_{0.999}Sc_{0.001})_5O_{12}$ | 0.2 | Garnet |

17

The thus-obtained oxide raw materials were subjected to dispersion and mixing treatment again in ethanol on a nylon ball mill with care to prevent contamination with each other. The treatment time was 24 hours. Subsequently, spray drying treatment was performed to prepare granular raw materials having an average grain size of 20 µm. The resulting 13 powder raw materials were subjected to uniaxial pressing and cold isostatic pressing treatment at a pressure of 198 MPa to obtain CIP formed bodies. The resulting formed bodies were subjected to debinding treatment in a muffle furnace at 1,000° C. for 2 hours. Subsequently, the debinded formed bodies were placed in a vacuum sintering furnace and were treated at 1,550° C. for 3 hours to obtain 13 sintered bodies. The resulting samples had a sintering relative density in the range of 94.5% to 98.8%.

The resulting sintered bodies were placed in a HIP furnace with a carbon heater and were subjected to HIP treatment at 200 MPa and 1,600° C. in an Ar atmosphere for 2 hours. The resulting sintered bodies did not substantially look gray (oxygen deficits absorption). However, as a precaution to sufficiently recover oxygen deficits, the resulting ceramic sintered bodies were subjected to annealing treatment in an oxygen atmosphere furnace at 1,450° C. for 20 hours under management for each lot. In this way, 13 sintered bodies of Examples and Comparative Examples were prepared.

Subsequently, the resulting ceramic sintered bodies were machined and polished into a disk shape with a diameter of 10 mm and a thickness of 1 mm and a rod shape (cylindrical shape) with a diameter of 5 mm and a length of 25 mm, and each sample was subjected to final optical polishing at both optical end surfaces thereof to an optical surface accuracy of λ/8 wherein measurement wavelength λ=633 nm.

Of the samples obtained as described above, the disk-shaped samples were subjected to thermal conductivity measurement in the following manner. Thereafter, the samples were subjected to thermal etching, and the average sintered grain size of each sample was measured. In addition, the rod-shaped samples were subjected to total light transmittance measurement, forward scatter measurement, and extinction ratio measurement as follows.

(Method of Measuring Thermal Conductivity)

The thermal conductivity was measured by laser flash analysis in accordance with JIS R 1611. Specifically, the samples having an outer diameter of 10 mm and a thickness of 1 mm were subjected to specific heat measurement in which the number of measurements "n" is 2 using a differential scanning calorimeter manufactured by PerkinElmer, Inc. and were then subjected to thermal diffusivity measurement in which the number of measurements "n" is 2 by irradiation with a xenon lamp using a thermal diffusivity measuring device manufactured by NETZSCH. These values and the theoretical densities of the respective compositions were used to determine the thermal conductivity by the following equation:

$$\text{Thermal conductivity (W/(m·K))} = \text{"theoretical density (kg/m}^3\text{)"} \times$$
$$\text{"specific heat capacity (J/(kg·K))"} \times \text{"thermal diffusivity (m}^2\text{/s)"}$$

(Method of Measuring Average Sintered Grain Size)

The average sintered grain size of the crystal grains of each sample was determined with reference to "Lineal Intercept Technique for Measuring Grain Size in Two-Phase Polycrystalline Ceramics" Journal of the American Ceramic Society, 55, 109 (1972). Specifically, the samples subjected to final optical polishing were treated by thermal etching at 1,300° C. in air for 6 hours, and the grain boundaries in the optical end surfaces were observed under a light microscope to determine the average sintered grain size. The average grain size, referred to as D, was determined to two significant figures by the following equation:

$$D = 1.56C/(MN)$$

wherein C is the length of an arbitrarily drawn line, N is the number of grains on the line, and M is the image magnification. N was about 10 to 20.

(Methods of Measuring Total Light Transmittance and Forward Scatter)

The total light transmittance and the forward scatter were measured at two wavelengths, namely, at wavelengths of 1,064 nm and 1,300 nm, using a V-670 spectrophotometer manufactured by JASCO Corporation. First, for total light transmittance measurement, light subjected to spectral separation by a spectroscope was incident on the V-670 spectrophotometer with no work (sample) set thereon. The light was collected by an integrating sphere set in advance on the instrument, and the collected light was received by a detector. The thus-obtained illuminance is referred to as $I_0$. Subsequently, a work was set on the instrument. Light subjected to spectral separation was incident on the work, and the transmitted light was collected again by the integrating sphere and was received by the detector. The thus-obtained illuminance is referred to as I. The total light transmittance was determined by the following equation:

$$\text{Total light transmittance (\%/25 mm)} = I/I_0 \times 100$$

Next, for forward scatter measurement, the same measurement system was used except that a reflector on the back side of the integrating sphere was removed from the state in which the work was set as described above. Light subjected to spectral separation was incident again on the work, and the transmitted light was collected again by the integrating sphere and was received by the detector. The obtained illuminance, which represents the scattered component other than the straight transmitted component, is referred to as Is. The forward scatter was determined by the following equation:

$$\text{Forward scatter (\%/25 mm)} = I_S/I_0 \times 100$$

The total light transmittance and the forward scatter were both measured at two wavelengths, namely, at wavelengths of 1,064 nm and 1,300 nm.

(Method of Measuring Extinction Ratio)

The extinction ratio as a Faraday rotator was measured as follows.

An optical system constructed using a light source manufactured by NKT Photonics AS, a collimator lens, a polarizer, a work stage, an analyzer, a power meter manufactured by Gentec EO, and a Ge photodetector was used. Light of wavelength of 1,064 nm was incident on one optical surface of the sample and transmitted through the sample in a state in which the beam diameter was set to a diameter as large as 3 mm. In this state, the light intensity $I_0'$ (maximum value as laser light intensity) was measured in a state in which the polarization plane of the analyzer coincided with the polarization plane of the polarizer. Subsequently, the polarization plane of the analyzer was rotated by 90 degrees, and the received light intensity I' (minimum value as laser light intensity) was measured again in a state in which the polarization plane of the analyzer was orthogonal to the polarization plane of the polarizer. The extinction ratio was determined by calculation based on the following equation:

$$\text{Extinction ratio (dB/25 mm)} = -10 \times \log_{10}(I'/I_0')$$

A beam diameter of more than 3 mm results in the periphery of the beam starting to be blocked by the outer periphery of a sample having a diameter of 5 mm; therefore, a beam diameter of 3 mm was defined practically as a state in which light is incident over the entire plane within the optical effective diameter of the sample.

Subsequently, the above optically polished samples were coated with an antireflective coating (AR coating) designed to have a center wavelength of 1,064 nm.

For each of the thus-obtained ceramic samples, the Verdet constant and the percent change in the beam diameter of laser light due to thermal lens were measured as follows. Specifically, as shown in FIG. 1, polarizing components (polarizer 120 and analyzer 130) were set forward and backward of each of the resulting ceramic samples (corresponding to the Faraday rotator 110). This ceramic sample was inserted into a center bore of a neodymium-iron-boron (Method of Measuring Verdet Constant)

The Verdet constant V was determined based on the following equation. The value used as the magnitude (H) of a magnetic field applied to each ceramic sample was calculated by simulation from the dimensions of the measurement system, residual magnetic flux density (Br), and coercivity (Hc).

$$\theta = V \times H \times L$$

wherein $\theta$ is the Faraday rotation angle (rad), V is the Verdet constant (rad/(T·m)), H is the magnitude (T) of the magnetic field, and L is the length of the Faraday rotator (0.025 m in this case).

(Method of Measuring Percent Change in Beam Diameter of Incident Laser Light Due to Thermal Lens)

A high-power laser (beam diameter: 1.6 mm) manufactured by IPG Photonics Japan Ltd. was operated to emit a spatially parallel beam at a power of 100 W, and the beam diameter at the focal position was measured with a beam profiler. Subsequently, each ceramic sample was set on the line of the emitted beam, and the percent change in beam diameter due to the set sample was measured again with the beam profiler. The difference between the two values was determined as the percent change in beam diameter due to thermal lens. Because the percent change in beam diameter is susceptible to measurement errors, the same measurement was performed again on a different day, and the larger value was used as the percent change in beam diameter.

The results are shown in Table 2.

TABLE 2

| | | Oxide raw material No. | Average sintered grain size (μm) | Wavelength of 1,064 nm | | Wavelength of 1,300 nm | | Verdet constant (rad/(T · m)) | Extinction ratio (dB/25 mm) | Percent change in beam diameter due to thermal lens (%) | Thermal conductivity (W/(m · K)) |
|---|---|---|---|---|---|---|---|---|---|---|---|
| | | | | Total light transmittance (%/25 mm) | Forward scatter rate (%/25 mm) | Total light transmittance (%/25 mm) | forward scatter rate (%/25 mm) | | | | |
| Example | 1 | 1 | 8.2 | 84.1 | 0.5 | 84.3 | 0.5 | 54 | 43 | 10 | 5.2 |
| | 2 | 2 | 7.5 | 84.1 | 0.4 | 84.2 | 0.4 | 51 | 44 | 9 | 5.0 |
| | 3 | 3 | 7.1 | 84.2 | 0.3 | 84.3 | 0.3 | 45 | 45 | 8 | 5.0 |
| | 4 | 4 | 6.3 | 84.3 | 0.2 | 84.4 | 0.2 | 40 | 47 | 6 | 4.9 |
| | 5 | 5 | 5.5 | 84.4 | 0.15 | 84.4 | 0.15 | 34 | 48 | 4 | 4.8 |
| | 6 | 6 | 5.9 | 84.3 | 0.3 | 84.4 | 0.3 | 44 | 47 | 7 | 4.9 |
| | 7 | 7 | 7.8 | 84.0 | 0.2 | 84.1 | 0.2 | 34 | 48 | 7 | 4.8 |
| Comparative | 1 | 8 | 8.8 | 81.3 | 0.6 | 82.1 | 0.6 | 56 | 39 | 11 | 5.3 |
| Example | 2 | 9 | 9.5 | 80.4 | 1.8 | 80.9 | 1.7 | 58 | 33 | 17 | 5.5 |
| | 3 | 10 | 9.1 | 82.7 | 1.4 | 83.0 | 1.3 | 46 | 35 | 14 | 5.0 |
| | 4 | 11 | 7.4 | 83.5 | 1.1 | 83.8 | 1.0 | 34 | 38 | 12 | 4.8 |
| | 5 | 12 | 4.7 | 84.4 | 0.2 | 84.4 | 0.2 | 31 | 47 | 5 | 4.6 |
| | 6 | 13 | 13.0 | 84.2 | 0.5 | 82.9 | 0.5 | 44 | 46 | 19 | 4.7 | magnet (magnet 140) with an outer diameter of 32 mm, an inner diameter of 6 mm, and a length of 40 mm. A high-power laser beam of wavelength of 1,064 nm was then incident on both end surfaces of the ceramic sample using a high-power laser (beam diameter: 1.6 mm) manufactured by IPG Photonics Japan Ltd. to measure the Verdet constant. Furthermore, the neodymium-iron-boron magnet was removed, and a high-power laser beam of wavelength of 1,064 nm was incident on each ceramic sample under the same conditions as above. The occurrence of thermal lens was measured and evaluated as the percent change in beam diameter.

As can be seen from the above results, all Examples (Examples 1 to 7), in which the composite oxide composition was controlled to that of the invention, and Comparative Example 5 had a total light transmittance of 84.0% or more, a forward scatter of 0.5% or less, and an extinction ratio of 42 dB or more at wavelengths of 1,064 nm and 1,300 nm, demonstrating that highly transparent paramagnetic garnet-type transparent ceramics were prepared. Furthermore, the percent change in the beam diameter of laser light entering at a power of 100 W due to thermal lens was also 10% or less, demonstrating that the paramagnetic garnet-type transparent ceramics were mountable on high-power laser systems. However, in Comparative Example 5, the Verdet constant fell below 32 rad/(T·m) because the Tb concentration was too low. Furthermore, the thermal conductivity was also less than 4.8 W/(m·K), probably because the proportions of Tb and Y were nearly equal and the average grain size was small.

In Comparative Examples 2 to 4, the extinction ratio, the total light transmittance, the forward scatter, and the percent change in beam diameter fell below the respective specified ranges because no Sc was added. In Comparative Example 1, the extinction ratio, the total light transmittance, the forward scatter, and the percent change in the beam diameter of laser light entering at a power of 100 W due to thermal lens fell below the respective specified ranges because the proportion of Tb was too high.

In Comparative Example 6, the thermal conductivity, the total light transmittance at a wavelength of 1,300 nm, and the percent change in the beam diameter of laser light entering at a power of 100 W due to thermal lens fell below the respective specified ranges because the amount of $SiO_2$ doping was too large.

In all of Examples 1 to 7, the thermal conductivity was 4.8 W/(m·K) or more because the average sintered grain size was 5 μm or more.

As can be seen from the above results, a highly transparent paramagnetic garnet-type transparent ceramic having an average sintered grain size of 5 μm or more, a linear transmittance of 84.0% or more and a forward scatter of 0.5% or less at a wavelength of 1,064 nm for an optical path length of 25 mm, and a linear transmittance of 84.0% or more and a forward scatter of 0.5% or less at a wavelength of 1,300 nm for an optical path length of 25 mm can be provided by controlling x, y, and z in formula (1) within the predetermined ranges of the invention and doping the ceramic with $SiO_2$ as a sintering aid in an amount within a predetermined range. Furthermore, the paramagnetic garnet-type transparent ceramic has a thermal conductivity of 4.8 W/(m·K) or more and a Verdet constant of 32 rad/(T·m) or more at a wavelength of 1,064 nm. When laser light of wavelength 1,064 nm is incident at a beam diameter of 1.6 mm and an incident power of 100 W, a percent change in its beam diameter of the laser light due to thermal lens for an optical path length of 25 mm is 10% or less. As a Faraday rotator, the paramagnetic garnet-type transparent ceramic has an extinction ratio of 42 dB or more at a wavelength of 1,064 nm for an optical path length of 25 mm. This transparent ceramic can be used as a magneto-optical material to provide a high-performance magneto-optical device that can be used for high-power applications.

Although the invention has been described with reference to the above embodiments, the invention is not limited thereto; rather, changes, including other embodiments, additions, modifications, and deletions, can be made as long as they are conceivable by a person skilled in the art, and all such embodiments are included within the scope of the invention as long as they provide the advantageous effects of the invention.

REFERENCE SIGNS LIST

100 optical isolator
110 Faraday rotator
120 polarizer
130 analyzer
140 magnet

The invention claimed is:

1. A paramagnetic garnet-type transparent ceramic which is a sintered body of a composite oxide having the formula (1):

$$(Tb_{1-x-y}Y_xSc_y)_3(Al_{1-z}Sc_z)_5O_{12} \qquad (1)$$

wherein $0.05 \leq x \leq 0.4$, $0 \leq y < 0.004$, $0.6 \leq 1-x-y < 0.95$, $0 \leq z < 0.004$, and $0.001 < y+z < 0.005$, wherein the paramagnetic garnet-type transparent ceramide contains more than 0% by weight to 0.1% by weight of $SiO_2$ as a sintering aid, has an average sintered grain size of 5 μm or more, has a total light transmittance of 84.0% or more and a forward scatter of 0.5% or less at a wavelength of 1,064 nm for an optical path length of 25 mm, and has a total light transmittance of 84.0% or more and a forward scatter of 0.5% or less at a wavelength of 1,300 nm for an optical path length of 25 mm.

2. The paramagnetic garnet-type transparent ceramic of claim 1, having a Verdet constant of 32 rad/(T·m) or more at a wavelength of 1,064 nm.

3. The paramagnetic garnet-type transparent ceramic of claim 1 wherein when laser light of wavelength of 1,064 nm is incident, an extinction ratio over an entire plane within an optical effective diameter thereof for an optical path length of 25 mm is 42 dB or more.

4. The paramagnetic garnet-type transparent ceramic of claim 1, wherein when laser light of wavelength 1,064 nm is incident at a beam diameter of 1.6 mm and an incident power of 100 W, a percent change in its beam diameter of the laser light for an optical path length of 25 mm is 10% or less.

5. The paramagnetic garnet-type transparent ceramic of claim 1, having a thermal conductivity of 4.8 W/(m·K) or more.

6. A magneto-optical material comprising the paramagnetic garnet-type transparent ceramic of claim 1.

7. A magneto-optical device constructed using the magneto-optical material of claim 6.

8. The magneto-optical device of claim 7 which is an optical isolator comprising a Faraday rotator composed of the paramagnetic garnet-type transparent ceramic and polarizers disposed forward and backward of the Faraday rotator on an optical axis thereof, the optical isolator being usable in a wavelength band of from 0.9 μm to 1.1 μm.

* * * * *